March 9, 1965 A. H. BOBECK 3,173,132

MAGNETIC MEMORY CIRCUITS

Filed Nov. 1, 1960 2 Sheets-Sheet 1

INVENTOR
A. H. BOBECK
BY William H. Kamstra
ATTORNEY

INVENTOR
A. H. BOBECK
BY William H. Kamstra
ATTORNEY

United States Patent Office 3,173,132

Patented Mar. 9, 1965

3,173,132

MAGNETIC MEMORY CIRCUITS

Andrew H. Bobeck, Chatham, N.J., assignor to Bell Telephone Laboratories, Incorporated, New York, N.Y., a corporation of New York Filed Nov. 1, 1960, Ser. No. 66,674
18 Claims. (Cl. 340—174)

This invention relates to information storage circuits, and particularly to such circuits in which binary information is stored in the form of remanent flux states in magnetic memory elements.

Coordinate array magnetic memory arrangements having particular magnetic information storage devices as individual information addresses at the crosspoints are well known in the information handling art. Thus, for example, coordinate memory arrays employing square loop toroidal cores for this purpose and operating on a coincident current basis have found wide application in information handling and data processing systems. In such memory arrays, to select a particular address for writing purposes, for example, current pulses are coincidentally applied to the coordinate conductors which define the address and which conductors are connected to windings inductively coupled to the core constituting the address. The magnitude of each of the current pulses is determined such that either of the current pulses alone is insufficient to cause a complete traversal from one remanent point of the hysteresis loop of the core to a point of opposite saturation. On the other hand, the total magnitude of the current pulses when applied coincidentally is sufficient to cause a complete switching from one remanent state to another when the existing magnetic state of the core permits.

It is clear from such a coincident drive operation that each of the nonselected cores having windings connected to the energized coordinate conductors will have a single half-select current pulse applied thereto. Each of these unselected cores will as a result undergo a partial flux excursion along its hysteresis loop without being driven into magnetic saturation in the opposite direction. After each such occasion at which the flux of a nonselected core is thus "shuttled," it must return to the remanent point on its loop from which it was driven by the half-select current pulse. This is obviously necessary if the core is properly to discriminate between the application of a total coincident full-select drive and a single half-select drive. However, this capacity to discriminate between applied drives is most advantageously accomplished if the hysteresis characteristic loop of the core material closely approximates the rectangular. In the normal case to achieve satisfactory dual coincident operation the rectangularity of the hysteresis loop of the core must be sufficient to achieve a discrimination between the amplitudes of the total drives applied having a ratio of at least two to one.

The more recently introduced magnetic wire memory elements, when employed on the conventional coincident current basis, must also be capable of performing this discrimination between levels of the access input drives. In order to insure this minimal two-to-one ratio of drive levels mentioned in the foregoing, a number of biasing arrangements in which the operating point on the hysteresis loop is shifted a predetermined amount in the direction of saturation have been developed. By these and other means some improvement in the drive level discrimination ratios has frequently been achieved. Multi-apertured magnetic structures may also be employed as information addresses at the crosspoints of the coordinate memory array. By means of these structures an access operation based on the coincidence of flux changes in the structure is made possible. As a result, a considerable improvement in the ability to discriminate between the partial drives applied to nonselected information addresses and the total coincident drive applied to the selected address is achieved. Such an arrangement is described, for example, in the patent of J. L. Rogers, No. 2,926,342 of February 23, 1960. By employing such multi-apertured structures a greater variation in the rectangularity and the uniformity of the hysteresis loops of the address cores of a memory array is permitted.

In coincident current access memory arrangements generally it is clear from the foregoing that in order to achieve a positive discrimination between full and partial select input drives, critical limitations are imposed on the magnitudes of the currents generating these drives. Thus, should any of the current pulses for generating a half-select drive exceed the critical limit established, an undesired switching of cores of the memory may be occasioned with a resulting loss of the stored information. The necessity of imposing such critical limitations on the access currents has thus presented a recurring problem in prior art magnetic memory arrangements, both in those employing the older toroidal cores and those exploiting the advantages of the newer magnetic wire memory elements as information storage elements.

In magnetic memory arrangements employing the latter magnetic wire memory elements as storage elements, it has frequently been the practice in prior art arrangements to apply one of the coincident currents to the wire memory element itself to achieve address selection. The other current is applied to a strip solenoid coupled to the wire element to provide the total drive necessary to switch the magnetic state of an address. Since such currents on the wire memory element cause substantial voltage drops across the elements, a serious problem is frequently encountered when a read operation immediately follows a write operation. In magnetic wire memory arrangements generally, read-out detection circuits are also connected directly to the wire memory elements. As a result, large potential drops across the elements during an immediately preceding write operation may have the effect of blocking the detecting amplifiers when it is necessary to detect the information representative ouput signals. If the necessity of applying access currents to the wire memory element itself is avoided, the latter element may, as a result, remain free to accomplish its information storage function and its novel function of acting as its own sensing conductor.

It is an object of the present invention to improve the ability to discriminate between drive levels of coincident current magnetic information storage devices in coordinate memory arrays.

It is another object of this invention to achieve the positive selection of information storage addresses in coordinate memory arrays employing magnetic wire memory elements while at the same time permitting wider coincident access current margins.

It is also an object of this invention to accomplish the writing of particular binary information bits in a magnetic wire coordinate memory array without the necesstiy of write fields being applied to the magnetic wire elements which are to contain the information.

Still another object of this invention is to provide a new and novel coincident current magnetic memory circuit.

The foregoing and other objects of this invention are achieved in a simplified single bit storage cell in which a single length strip solenoid is transversely inductively coupled to a magnetic wire memory element to define a single information address segment thereon. The magnetic wire memory element may advantageously be of the character described in the copending application of the present inventor, Serial No. 675,522 filed August 1, 1957, now Patent No. 3,083,353, issued March 26, 1963. In one of the embodiments of the element there described a magnetic tape of a material exhibiting substantially rectangular hysteresis characteristics is helically wound about an electrical conductor to constitute the memory element. By applying an external drive field to the element so constituted, particular segments of the wound magnetic tape of the wire element may be remanently magnetized. A single bit storage cell according to the present invention further comprises an electrically conducting magnetic shunt of a magnetic material having a high magnetic permeability arranged parallelly with the magnetic wire memory element and in inductive association with the strip solenoid. In one embodiment of this invention, the magnetic shunt may advantageously be interposed between the strip solenoid and the wire memory element to accomplish a magnetic shielding function.

In order to write either binary information bit in the information address segment of the wire memory element defined by the strip solenoid, a current pulse is applied to the solenoid alone. No critical ceiling limitations are imposed on this current pulse, the only requirement being that it be of sufficient magnitude to be capable of driving the address segment from one remanent point on its hysteresis loop to the opposite remanent point. If a binary 0, for example, is to be introduced in the address segment, that is, if the segment is to be left in the reset magnetic state to which it was driven during a preceding read phase in the conventional manner, no other currents need be applied to the storage cell. The high permeability shunt, in providing a low reluctance path for the drive field generated by the solenoid, effectively shields the drive field without causing a flux change in the address segment. When, on the other hand, a binary 1 is to be written into the address segment, a switching of the segment to a set remanent magnetic state is necessary. Accordingly, a current pulse is applied to the electrically conducting shunt coincidentally with the current pulse applied to the strip solenoid. The magnetic permeability of the shunt is thus reduced with the result that the latter element loses its effectiveness as a field shunt. The field generated by the strip solenoid is thus rendered effective to cause a flux switching in the address to store the binary 1. It may be noted that the coincident current pulse applied to the magnetic shunt element also has no critical upper limit, its magnitude being controlled only to the extent of reducing the permeability of the shunt sufficiently to permit the drive field to act on the address segment. Thus, according to the principles of the present invention, information input control is accomplished by varying the magnetic coupling between a drive solenoid and the magnetic memory element comprising an information storage address.

An information bit stored in accordance with the foregoing mode of operation may be read out of the address segment in the manner conventional with magnetic wire memory elements generally. A read-out current pulse of a polarity opposite to that of the write current pulse is applied only to the strip solenoid defining the address segment. The magnitude of the read-out current pulse again is sufficient to cause a flux switching in the address segment overriding the shielding effect of the magnetic shunt if the direction of the magnetic state of the segment permits. This flux switching is detected across the ends of the wire memory element as a potential change indicative of a binary 1, also in the conventional manner.

A single information storage cell according to the principles of this invention as briefly described in the foregoing may advantageously be applied to realize a coordinate memory array. An illustrative one such array comprises a plurality of parallelly arranged magnetic wire memory elements further arranged in conjunction with a plurality of transverse strip solenoids. The solenoids may advantageously be doubled back to encircle the wire memory elements and are inductively coupled thereto to define a coordinate array of information address segments thereon. The coordinate array thus made up is arranged on a word organized basis with the binary information words being defined by the strip solenoids. The corresponding bit addresses of the words then appear consecutively on the continuous wire memory elements as discrete, separate segments defined by the solenoids. A plurality of parallelly arranged electrically conducting shunts of a material having a high magnetic permeability is inductively associated with the strip solenoids to provide the shunting or shielding function described in connection with the single storage cell in the foregoing. The magnetic shunts may be arranged in parallel with the magnetic wire memory elements for ease of fabrication and may be interposed in association with the wire memory elements between the doubled strip word solenoids.

To write the information bits of a binary word into a selected word row of address segments, a current pulse is applied to the strip solenoid defining the word row to generate a drive field operative on the selected row of address segments. Coincidentally with this current pulse, current pulses are selectively applied to the electrically conducting shunts to control the permeability of the latter elements in accordance with the information bits of the word being written. Thus, in those addresses of the word which are to contain binary 0's no current pulses are applied to the shunt elements in order that the shunting effect may remain high and thereby deflect the drive field from the address segments. Where binary 1's are to be stored, the permeability of the shunt elements is reduced by applied coincident current pulses so that the drive field may be effective to switch the associated address segments to a set remanent magnetic state.

One of the features of this invention is thus that a high permeability, electrically conducting magnetic shunting element is positioned in inductive relationship with the address segments of a wire memory element in a magnetic wire memory array. The permeability of the shunting element is controlled in accordance with the character of the information bit to be introduced into a selected information address segment of the element. The effectiveness of the write field being applied by the word solenoid during a write operation is thus controlled or "gated" to achieve bit selection.

It is another feature of this invention that the word solenoids of a magnetic wire memory array provide the entire drive field during a write operation. As an advantageous result no partial fields are applied to non-selected information addresses to cause partial flux excursions with attendant generation of unwanted shuttle signals. Since the bit selection is not dependent upon the additive drive generated by the coincident currents, no critical upper limits are imposed on the magnitudes of these currents.

The foregoing and other objects and features of this invention will be better understood from a consideration of the detailed description of various embodiments thereof which follows when taken in conjunction with the accompanying drawing in which.

Figure 1:
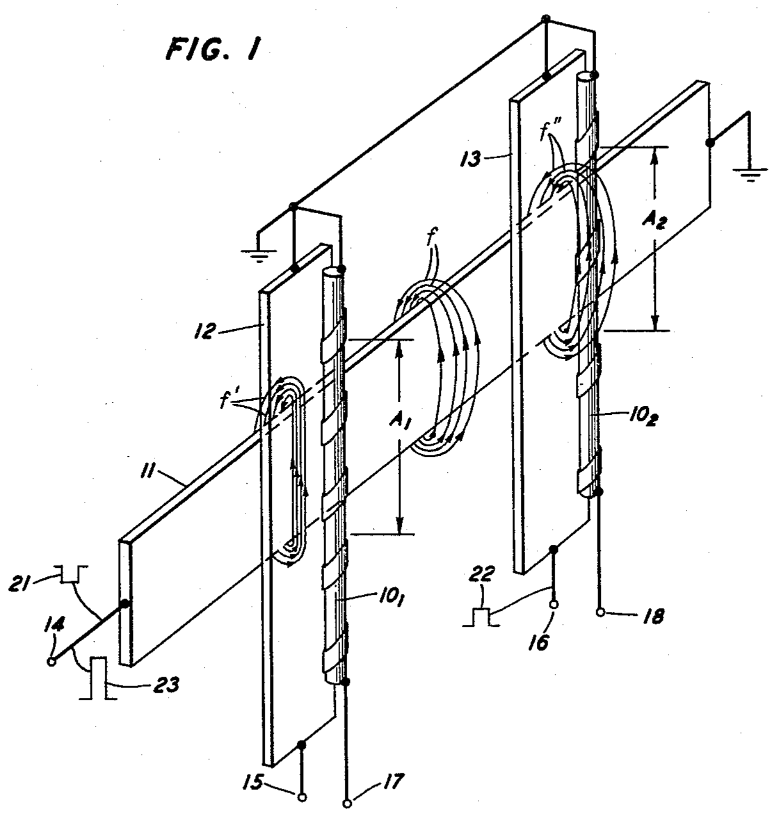
FIG. 1 shows in simplified form one specifc illustrative two address storage cell according to the principles of this invention.

An illustrative simplified information storage circuit is depicted in FIG. 1 to demonstrate in detail the principles of this invention. This circuit comprises a pair of parallelly arranged magnetic wire memory elements $10_1$ and $10_2$ each of which in turn comprises a magnetic tape helically wound on an electrical conductor in accordance with the principles of such memory elements described in detail in the copending application of the present inventor referred to hereinbefore. The tapes are advantageously fabricated of a magnetic material exhibiting substantially rectangular hysteresis characteristics to provide the remanent magnetic properties on which their information storage ability is based. Although tape-wound memory elements of the character just described may advantageously be employed in the practice of this invention, magnetic wire elements in which the flux component constitutes an integral part of the conductor element may also be employed with equal advantage. Another wire memory element which may also be employed within the scope of the present invention is described in the copending application of U. F. Gianola, Serial No. 690,478, filed October 16, 1957, now Patent No. 3,069,661, issued December 18, 1962. Accordingly, the term "magnetic wire memory element" as used in connection with the description of embodiments of this invention which follows is understood to define not only the tape-wound elements specifically described and shown in the drawing, but any wire memory elements in which a remanent flux in a discrete segment thereof may be switched from one remanent state to another.

Inductively coupled to the wire elements $10_1$ and $10_2$ is an electrically conducting strip solenoid 11 which defines a pair of information address segements $A_1$ and $A_2$ on the elements $10_1$ and $10_2$, respectively. An electrically conducting magnetic shunting means in interposed between each of the elements $10_1$ and $10_2$ and the solenoid 11. The shunting means may advantageously comprise, in the embodiment being described, the strips 12 and 13, which strips are fabricated of a magnetic material having a high permeability such as, for example, the material known commercially as 4–79 Moly-permalloy. As will appear from other embodiments to be described hereinafter, the flat strips 12 and 13 may take other and varied forms and may, for example, comprise other magnetic wire memory elements such as the elements $10_1$ and $10_2$.

One end of each of the elements $10_1$ and $10_2$ is connected to ground as is one end of each of the strips 12 and 13. One end of the strip solenoid 11 is also connected to ground and the other end is provided with a terminal 14. Terminals 15 and 16 are also provided for the other ends of the shunting strips 12 and 13, respectively. The magnetic wire memory elements $10_1$ and $10_2$ are likewise provided with terminals 17 and 18 which are used for output purposes as will be seen hereinafter.

With the foregoing organization of a simplified illustrative storage circuit according to this invention in mind, the simultaneous introduction of information bits in the address segments $A_1$ and $A_2$ may now be described. For purposes of illustration it will be assumed that a binary 0 is to be written into the address segment $A_1$ and a binary 1 is to be written in the address segment $A_2$. As a result of an assumed prior read-out operation, each of the address segments $A_1$ and $A_2$ is remanently magnetized in a reset direction which may be regarded as downward as viewed in FIG. 1 of the drawing. To accomplish the foregoing write operation a negative write current pulse 21 is applied to the terminal 14. This pulse is provided by a suitable source not shown in the drawing but which is readily available to one skilled in the art. As a result of the applied pulse 21 a magnetic field is generated about the solenoid 11 in the direction as represented by the lines of force $f$ in FIG. 1. Obviously this field is present at that entire length of the strip solenoid 11 and is accordingly operative at the address segments $A_1$ and $A_2$. However, at the address segment $A_1$ the high permeability shunting strip 12 provides a low reluctance path for the generated field so that the field is there effectively shunted as depicted by the lines of force $f'$ in the drawing. As a result, the reset magnetic state of the address segment $A_1$ of the element $10_1$ is left undisturbed by the write pulse 21. The binary bit 0 is thus stored in the address segment $A_1$ in this reset magnetic state in accordance with conventional practice.

In order to write the binary 1 in the address segment $A_2$ a current pulse of either polarity such as the positive current pulse 22 is applied to the terminal 16 and hence to the shunting strip 13 coincidentally with the current pulse 21 applied to the solenoid 11. The pulse 22 may also be supplied by a source well known in the art and not shown in FIG. 1. Although the polarity of the current pulse 22 is immaterial, its magnitude is determined to be sufficient to substantially saturate the strip 13 to reduce its permeability. The current pulse 22 thus has no critical upper limit of magnitude. Since the shunting strip 13 now presents a path of high reluctance to the field generated about the solenoid 11, the latter field, represented by the lines of force $f''$ at the address segment $A_2$, is enabled to switch the reset magnetic state of the address segment $A_2$ to the set state. This may be regarded as being in the upward direction as viewed in the drawing and is conventionally representative of a binary 1. It will be appreciated from this exemplary writing operation, that although a coincidence of current pulses is employed to introduce the binary value 1 in an address segment, the coincidence of current pulses alone is sufficient to accomplish this, there being no critical adding of the drives generated by the coincident current pulses.

During a subsequent read-out operation, a read current pulse of the opposite polarity is applied to the strip solenoid 11, such as the positive current pulse 23. This pulse is of sufficient magnitude to generate an overriding field about the solenoid 11 which is able to cause a complete flux switching in the address segments defined by the solenoid 11 without regard to the shunting effect of the shunting strips 12 and 13. Thus, although the latter strips will still provide their high permeability flux paths, the switching drive provided by the field generated about the solenoid 11 by the read current pulse 23 is of sufficient magnitude to switch the remanent flux in the address segments defined by the solenoid 11. Accordingly, those address segments which were set during the write phase of operation will be switched back to the reset magnetic state. This flux switching in the magnetic flux components, such as the tapes wound around the conductors of the elements $10_1$ and $10_2$, causes a voltage drop thereacross in the manner well known in connection with the principle of operation of magnetic wire memory elements generally. In the present illustrative case, the applied read current pulse 23 acts to switch the flux in the address segment $A_2$ to the reset state to induce a read-out signal across the ends of the wire memory element $10_2$. This read-out signal will be available at the terminal 18 for identification as representative of the binary 1 previously stored therein. The read pulse 23 also affects the address segment $A_1$ in that the remanent flux in that segment is driven further into saturation. As a result a negligible shuttle signal is also induced across the ends of the element $10_1$. However, as is known this latter signal occurring when a binary 0 is read out may be distinguished from the full-valued signal representative of a binary 1 by suitable gating or threshold devices connected to the output terminal 17.

From the foregoing illustrative cycle of operation it is clear that the memory elements $10_1$ and $10_2$ perform only the functions of information storage and sensing, these functions being completely free during readout from interference by magnetic drives or voltage drops occurring during write operations. After the read operation has been completed and each of the address segments $A_1$ and $A_2$ has been restored to the reset magnetic state, the circuit is again in readiness for a subsequent write operation during which the same or new information bits may be introduced therein. It should be noted that, although in the embodiment just described the shunting strips 12 and 13 were interposed between the elements 10 and solenoid 11, the relative positions of these elements could have been arranged differently without affecting the ultimate storage function of the circuit. Thus the strips 12 and 13 may be arranged within the scope of this invention in any position in which the effective field applied to the information address segments may be controlled by controlling the magnetic permeability of the strips 12 and 13. In addition, as has been previously mentioned, the magnetic shunting means comprising the strips 12 and 13 may take other and different forms. Thus, in accordance with another embodiment of this invention the shunting means comprises magnetic wire memory elements of the character of the information storage elements themselves. This embodiment is depicted in FIG. 2 of the drawing.

Figure 2:
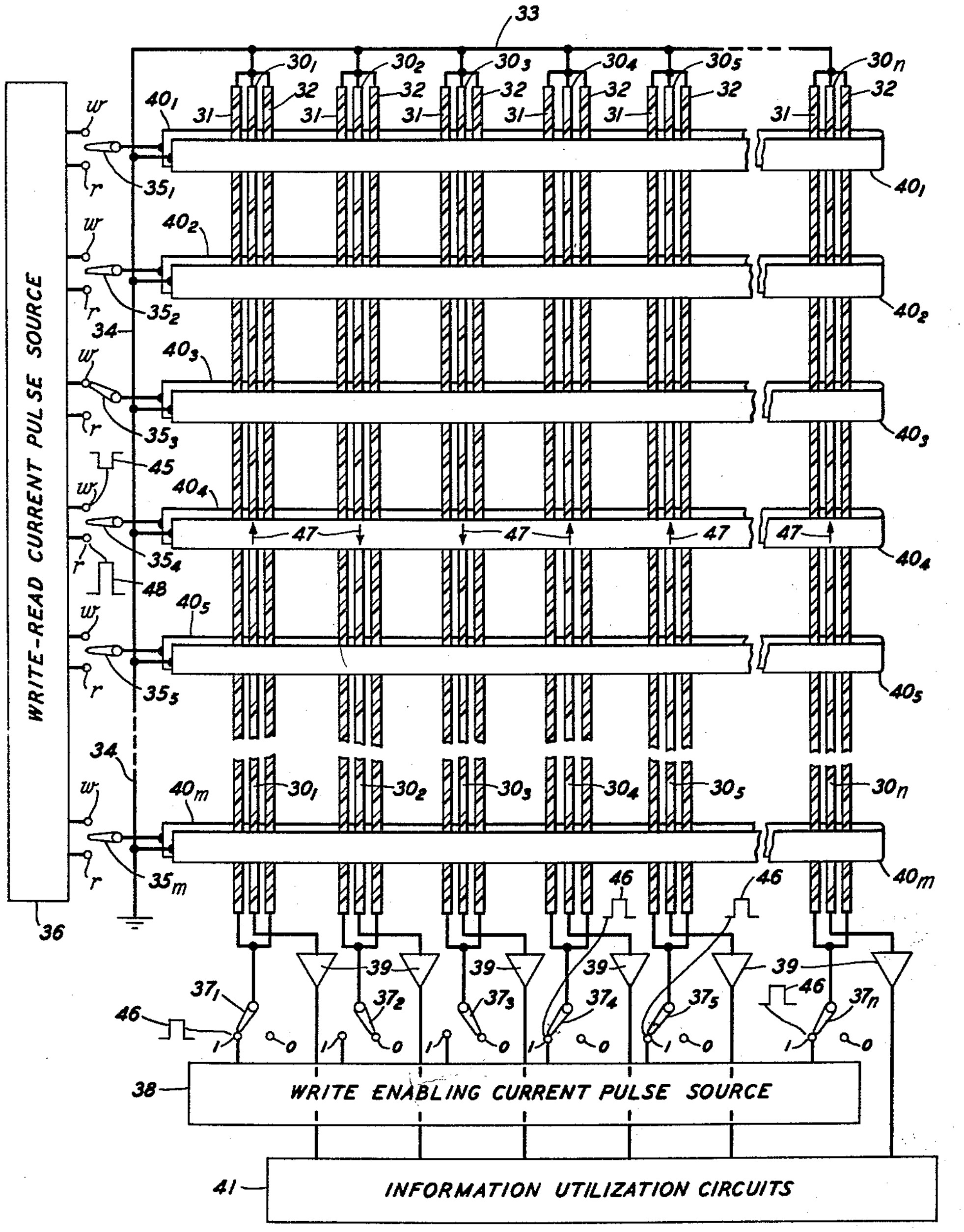
FIG. 2 shows another illustrative embodiment of this invention comprising a magnetic wire memory presenting a coordinate array of information addresses organized according to the principles of this invention.

The coordinate memory array of FIG. 2 embodying the principles of this invention comprises a plurality of parallelly arranged magnetic wire memory elements $30_1$ through $30_n$. The elements 30 may also be of the character of any of the wire memory elements described in connection with the embodiment of FIG. 1. In the embodiment of FIG. 2 each of the memory elements 30 comprises an electrical conductor having a helical flux component axially coincident therewith such as a single magnetic tape wound therearound. The tape is of a magnetic material exhibiting substantially rectangular hysteresis characteristics to provide the required remanent magnetic properties. A plurality of strip solenoids $40_1$ through $40_m$ are parallelly arranged transversely to the memory elements 30 and are inductively coupled thereto to define a coordinate array of information address segments thereon. The solenoids 40 pass in one direction along one side of the successive memory elements 30, encircle the latter elements, and return in the opposite direction on the other side of the elements 30. On either side of each of the memory elements 30 is another magnetic wire memory elements 31 and 32. The latter elements constitute the counterparts of the shunting strips 12 and 13 described in connection with the embodiment of FIG. 1 and comprise electrical conductors also having magnetic tapes helically wound therearound. In connection with the shunting elements 31 and 32, however, it has been found that instead of a single magnetic tape, a number of tapes, wound around the electrical conductor will better serve the purpose of this invention. Since no memory function is performed by the shunting elements 31 and 32, the hysteresis characteristics of the wound tapes are selected as substantially linear.

Each of the elements 30, 31, and 32 is connected at one end to a ground bus 33 and each of the strip solenoids 40 is connected at one end to a ground bus 34. The other end of each of the solenoids 40 is connected to a two-position switch 35 operable to either of two contacts *w* and *r*. The latter contacts comprise output terminals of a write-read current pulse source 36. The latter source is shown only in block symbol form and may comprise any suitable circuitry well known in the art capable of providing current pulses of the polarity and magnitude and at the times to be described in detail hereinafter. The magnetic shunting elements 31 and 32 associated with each of the memory elements 30 are each connected at the other end to a two-position switch 37. The shunting elements 31 and 32 are connected in pairs to the switches 37; the pair of elements 31 and 32 associated with each of the memory elements $30_1$ through $30_n$ being connected to the switches $37_1$ through $37_n$, respectively. Each of the switches 37 is operable to either one of a pair of contacts 1 and 0, the contacts 1 comprising the output terminals of a write enabling current pulse source 38. In the embodiment being described the contacts 0 are idle and have no signals applied thereto as will become clear from a description of an illustrative operation thereof which follows.

Each of the wire memory elements 30 is connected at its other end to information utilization circuits 41 through individual detecting amplifiers 39. The latter components as well as the utilization circuits 41 may also comprise well known circuits suitable for performing the functions to be described. Since such circuits are readily available to one skilled in the art they are shown in block symbol form only herein and need not be described in greater detail. Similarly, the current pulse source 38 may comprise circuits known in the art for providing current pulses of the character to be more particularly described in connection with the illustrative operation hereinafter. The illustrative memory array according to this invention so far described is organized on a word basis. That is, each of the strip solenoids 40 defines on the magnetic wire memory elements 30 a row of information address segments each able to store a single bit of the bits making up the binary word. Readout is thus accomplished by interrogating all of the bits of a word simultaneously at which time each of the bit address segments is restored to its normal reset remanent state.

Assuming that such a readout has occurred in a previous read-out phase of operation, the introduction into a word row of information address segments of an exemplary binary word may now be described. For this purpose it will further be assumed that the binary word, 1, 0, 0, 1, 1, . . . 1 is to be written into the word row defined by a selected strip solenoid $40_4$. Each of the address segments defined on the memory elements 30 by the solenoid $40_4$ will at this time be in a reset remanent state, that is magnetized downward as viewed in the drawing. The write operation is initiated by the operation of the switch $35_4$ to its *w* contact and the operation of the switches 37 in accordance with the binary bits of the word to be written. Accordingly, the switches $37_1$, $37_4$, $37_5$, and $37_n$ will be operated to their 1 contacts and the switches $37_2$, and $37_3$ will be operated to their 0 contacts. With the circuit connections thus made, the necessary coincident energizing current pulses from the sources 36 and 38 may be applied. A negative write current pulse 45 is provided by the current source 36 at this time and is applied via the contact *w* to the strip solenoid $40_4$. As previously mentioned, the current pulse 45 is of a magnitude to generate magnetic fields about both sections of the solenoid $40_4$ sufficient to cause a flux switching in any or all of the address segments defined thereby. Such a write drive is accordingly operative at each of the latter address segments. Coincidentally with the application of the write current pulse 45 to the solenoid $40_4$, a write enabling current pulse 46 is applied via the switches $37_1$, $37_4$, $37_5$, and $37_n$ and their contacts 1 to the pairs of shunting elements 31 and 32 associated with the memory elements $30_1$, $30_4$, $30_5$, and $30_n$, respectively.

The action of the solenoid $40_4$ write drive field on the address segments defined thereby on the memory elements $30_2$ and $30_3$ is effectively inhibited by the shunting elements 31 and 32 associated with these memory elements. The magnetic tapes helically wound around the conductors of the elements 31 and 32 present a high permeability and therefore a low reluctance to the magnetic field existing at the above address segments with the result that the write drive field is shunted away from the segments. The address segments of the word row in which information is presently being written and which are defined on the memory elements $30_2$ and $30_3$, will thus be left magnetically undisturbed and will therefore remain in the reset remanent magnetic state. This magnetic state is conventionally representative of a binary 0. The address segments at which the associated shunting elements 31 and 32 have a current pulse 46 applied thereto, on the other hand, will be acted upon by the full force of the write drive. The write enabling current pulses 46, although shown as being positive in the drawing, may be of either polarity to accomplish its saturation function on the shunting elements 31 and 32. The latter shunting elements associated with the address segments defined on the memory elements $30_1$, $30_4$, $30_5$, and $30_n$ will, as a result, have their permeability substantially reduced so that these elements will at this time present relatively high reluctance paths to the write drive field. Accordingly the latter field is enabled to cause a flux switching in the address segments of the present word row which are to have binary 1's stored therein. These segments will, as a result, have a remanent magnetization which may be regarded as upward as viewed in the drawing. The magnetizations and their directions resulting from the foregoing write operation are represented in the drawing by the arrows 47.

It will be appreciated that during the write operation just described, no current pulses are applied to the memory elements 30 themselves. Thus, the address segments of other word rows will remain magnetically undisturbed while the information in a selected word row is being changed. Further, since no critical upper limit is imposed on the write current pulses 45 and 46, it is clear from the embodiment of FIG. 2 that no burden to discriminate between the application of a single pulse 45 or a single pulse 46 is in turn imposed on an address segment of the memory array. In a magnetic wire memory array embodying the principles of this invention it is thus clear that the information bits of a word row are introduced by selectively varying the coupling between the word drive solenoid and the information address segments defined thereby.

An exemplary write operation of the embodiment of FIG. 2 has been described in connection with an illustrative word row defined by the solenoid $40_4$. In an actual system application of this embodiment it will be understood by one skilled in the art that the word row solenoids 40 may be driven sequentially or on a selective basis with read-out operations being interleaved with the write operations as dictated by the requirements of the system of which this invention may advantageously comprise a part. Such a readout operation may now be described with respect to the same illustrative word row defined by the word solenoid $40_4$. The information bits of the latter word row may be read out by operating the switch $35_4$ to its *r* contact as a result of which the solenoid $40_4$ is connected to the other associated output of the write-read current pulse source 36. At this time a read current pulse 48 is applied via the contact *r* and the switch $35_4$ to the word solenoid $40_4$ to generate a read field about the latter solenoid. The current pulse 48 is of sufficient magnitude to supply a switching drive which overrides the shunting effect of the shunting elements 31 and 32 which at this time may have no currents applied thereto. The read current pulse 48 is thus effective to switch the flux of the set address segments containing binary 1's to the reset remanent magnetic state. This flux switching generates a voltage signal across the ends of each of the memory elements 30 on which the latter segments are defined, which signals are detected by the associated detecting amplifiers 39. Thus, in accordance with the binary word 1, 0, 0, 1, 1, . . . 1 stored in present word row, read-out signals are generated across the memory elements $30_1$, $30_4$, $30_5$, and $30_n$. These signals representative of the binary 1's of the word being read out, are transmitted via the respective detecting amplifiers 39 to the information utilization circuits 41. The latter circuits may also comprise associated external circuitry of the system in which the present invention advantageously finds application. The read drive field applied to the information address segments containing binary 0's also causes minor flux excursions in those segments as they are driven further into saturation or shuttled. However, the signals generated by these flux excursions are of opposite polarity and of negligible magnitude as compared with the signals representative of binary 1's and are readily discriminated therefrom by means and circuits well known in the art. The illustrative word row is now in condition to have the same or new information bits restored therein in a subsequent write operation. In accordance with one of the advantages mentioned previously herein, a read operation may follow immediately upon a write operation without interference with potentials which may exist across the memory elements 30 resulting from write drives applied thereto. This advantageously follows from the fact that no drives are applied to the memory elements 30 themselves during a write operation.

Figure 3:
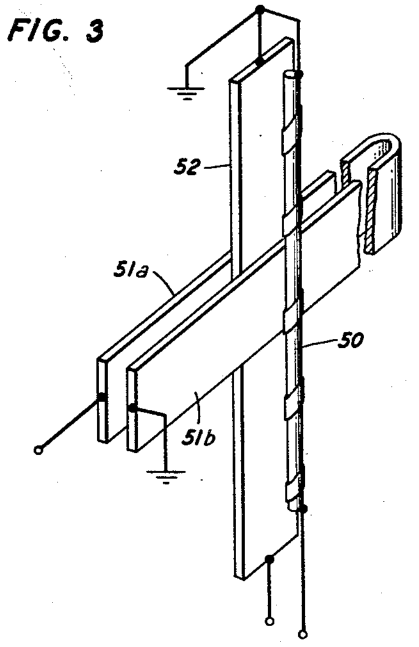
FIG. 3 shows in simplified form another specific illustrative information storage cell incorporating a modification in the physical relationship of the elements.

From the foregoing description of the principles of this invention as embodied in the memory array of FIG. 2, it is clear that memory arrays may also be achieved in which a different physical relationship exists between a solenoid, memory element, and shunting element. Thus, for example, in FIG. 3 is depicted in connection with a single information address, a relationship between these elements in which the high permeability property of the shunting element is used to increase the effectiveness of the drive field on the information address segment. In this case an information address segment is defined on a magnetic wire memory element 50 by a strip solenoid 51 which, by means of folded portions 51*a* and 51*b* thereof, encircles the high permeability shunting element 52. The portion 51*b* of the solenoid 51 thus passes between the shunting element 52 and the memory element 50. In the embodiment of this invention of FIG. 3 the magnetic coupling of the drive solenoid 51 is again controlled to accomplish a write operation. As in the embodiments of this invention previously described, this coupling is in turn controlled by varying the permeability of the magnetic shunting element 52 by applying a saturating current thereto coincidentally with the drive pulse applied to the drive solenoid. The shunting effect of the element 52 is utilized in the embodiment of FIG. 3 just as it is in previous embodiments with the exception that whereas a low permeability state thereof resulted in the writing of a binary 1 in previous embodiments, in the embodiment of FIG. 3 this low permeability state results in the writing of a binary 0. This is clear from a consideration of the magnetic effect of the shunting element 52 in FIG. 3. Normally the element 52 has a high permeability with the result that when a current pulse is applied to the drive solenoid, a low Ni drop exists across the solenoid in the gap between the portions 51*a* and 51*b* thereof. As a result, a substantial field is applied to the information address segment defined on the memory element 50. This field is effective to cause a flux switching in the address segment to its set remanent magnetic state representative of a binary 1. When the shunting element 52 on the other hand is brought to a lower permeability state by the application of a write enabling current pulse applied thereto coincidentally with the drive on the solenoid 51, the reluctance of the flux path within the gap between the portions 51*a* and 51*b* is substantially increased. Thus, since a large part of the applied field is produced within the gap between the portions 51*a* and 51*b* in this case, a correspondingly reduced field is produced outside of the gap to act on the information address segment. This reduced field is insufficient to cause a flux switching in the address segment from its normal reset remanent magnetic state in which latter state it remains after a write operation to store a binary 0. Obviously, in each of the embodiments of this invention described, the binary values assigned to the particualr functioning of the shunting means is a matter of choice which may be made on the basis of particular system applications.

The relative dimensions and the relationships of the various components of the embodiments of this invention shown in the drawing are illustrative only and have been exaggerated for purposes of clarity. Thus the shunting elements and memory elements such as the elements 31, 32, and 30 shown in FIG. 2 in particular have been shown out of proportion to their actual size and, in the practice of this invention, these elements would appear greatly reduced in diameter. Similarly in the actual practice of this invention the latter elements may advantageously be embedded in a nonconductive, nonmagnetic tape, such as Mylar, for facility and speed of fabrication. Further although the control of the writing and reading operations have been described in the embodiment of FIG. 2 as being accomplished by the switches 35 and 37, the control and timing of the write and read current pulses 45 and 48 together with the control and timing of the write enabling current pulses 46 would be achieved by electronic or other magnetic means as is well konwn in the art. It will also be appreciated that although current pulses of particular polarities have been described current pulses of other polarities could have been employed without affecting the essential operation of this invention.

Accordingly, it is to be understood that what have been described are considered to be only specific illustrative embodiments of this invention and various and numerous other arrangements may be devised by one skilled in the art without departing from the spirit and scope thereof.

What is claimed is:

1. An information storage circuit comprising a magnetic wire memory element capable of having segments thereof magnetized in one or the other remanent magnetic state, an electrical first conductor inductively coupled to said memory element and defining an information address segment thereon, said address segment being magnetized in said one remanent magnetic state, means for applying a first current pulse to said first conductor for generating a magnetic field of a magnitude sufficient to switch said address segment from said one to said other remanent magnetic state; and information control means comprising a magnetically permeable electrical second conductor inductively associated with said first conductor for shunting said field from said address segment to leave said segment in said one remanent magnetic state representative of one binary value, and means for applying a second current pulse to said second conductor simultaneously with said first current pulse to change the permeability of said second conductor to permit said field to switch said address segment to said other remanent magnetic state representative of the other binary value.

2. An information storage circuit as claimed in claim 1 also comprising read-out means comprising means for applying a read current pulse to said first conductor for generating a magnetic field of a magnitude and polarity sufficient to switch said address segment from said other remanent magnetic state back to said one remanent magnetic state and means for detectinv potential changes across the ends of said wire memory element.

3. An information storage circuit comprising a plurality of magnetic wire memory elements, each being capable of having segments thereof magnetized in one or the other remanent magnetic state, an electrical first conductor inductively coupled to said memory elements and defining a plurality of information address segments thereon, each of said address segments being magnetized in said one remanent magnetic state, means for applying a first current pulse to said first conductor for generating magnetic fields of a magnitude sufficient to switch said address segments from said one to said other remanent magnetic state; and information control means comprising a plurality of magnetically permeable electrical second conductors inductively associated with said first conductor at each of said address segments for shunting said fields from said address segments to leave said segments in said one remanent magnetic state representative of one binary value, and means for selectively applying second current pulses to particular ones of said second conductors simultaneously with said first current pulse to change the permeability of said last-mentioned second conductors to permit said fields to switch the address segments defined by said last-mentioned conductors to said other remanent magnetic state representative of the other binary value.

4. An information storage circuit as claimed in claim 3 also comprising read-out means comprising means for applying a read current pulse to said first conductor for generating magnetic fields of a magnetude and polarity sufficient to switch said address segments from said other remanent magnetic state back to said one remanent magnetic state and means for detecting potential changes across the ends of said wire memory elements.

5. A memory array comprising a plurality of magnetic wire memory elements, each being capable of having segments thereof magnetized in one or the other remanent magnetic state, a plurality of electrical first conductors inductively coupled to said plurality of wire memory elements and being arranged with respect to said last-mentioned elements so as to define a coordinate array of information address segments thereon, each of said address segments being magnetized in said one remanent magnetic state, means for selectively applying a first current pulse to a particular one of said plurality of first conductors for generating magnetic fields of a magnitude sufficient to switch the address segments defined by said particular first conductor from said one to said other remanent mangetic state; and information control means comprising a plurality of magnetically permeable electrical second conductors inductively associated with said plurality of first conductors at each address segment of said coordinate array of information address segments for shunting said fields from said address segments to leave said segments in said one remanent magnetic state representative of one binary value, and means for selectively applying second current pulses to particular ones of said second conductors simultaneously with said first current pulse to change the permeability of said last-mentioned second conductors to permit said fields to switch the address segments defined by said last-mentioned conductors and said particular one of said first conductors to said other remanent magnetic state representative of the other binary value.

6. A memory array as claimed in claim 5 also comprising read-out means comprising means for selectively applying read current pulses to said plurality of first conductors for generating magnetic fields of a magnitude and polarity sufficient to switch said address segments from said other remanent magnetic state back to said one remanent magnetic state and means for detecting potential changes across the ends of said plurality of wire memory elements.

7. An information storage circuit comprising a magnetic wire memory element capable of having segments thereof magnetized in one or the other remanent magnetic state, an electrical first conductor inductively coupled to said memory element and defining an information address segment thereon, said address segment being magnetized in said one remanent magnetic state, means for applying a first current pulse to said first conductor for generating a magnetic field of a magnitude sufficient to switch said address segment from said one to said other remanent magnetic state; and information control means comprising a magnetically permeable electrical second conductor inductively associated with said first conductor and means for applying a second current pulse to said second conductor simultaneously with said first current pulse to change the permeability of said second conductor to thereby control the switching effect of said magnetic field on said address segment.

8. An information storage circuit as claimed in claim 7 in which said first conductor comprises a flat strip solenoid encircling said magnetically permeable electrical second conductor such that said field is shunted by said last-mentioned conductor from said address segment when said second current pulse is applied to said last-mentioned conductor to leave said segment in said one remanent magnetic state representative of one binary value.

9. An information storage circuit as claimed in claim 7 in which said first conductor comprises a flat strip solenoid encircling both said magnetic wire memory element and being arranged with respect to said magnetically permeable electrical second conductor such that said field is enabled to switch said address segment to said other remanent magnetic state when said second current pulse is applied to said last-mentioned conductor representative of the other binary value.

10. An information storage circuit comprising a magnetic memory element capable of assuming a first and a second remanent magnetic state, first inductive means magnetically coupled to said memory element for driving said element from said first remanent state to said second remanent state and back to said first remanent state, fixed second inductive means for varying the magnetic coupling between said first inductive means and said memory element in accordance with input information, and a read-out means associated with said memory element.

11. An information storage circuit comprising a plurality of discrete memory elements each being individually capable of assuming a first and a second remanent magnetic state, first inductive means magnetically coupled to said plurality of memory elements for driving said elements from said first remanent state to said second remanent state and back to said first remanent state, a plurality of fixed second inductive means for selectively varying the magnetic coupling between said first inductive means and said plurality of memory elements in accordance with binary input information bits, and read-out means associated with each of said plurality of memory elements.

12. An information storage circuit comprising a plurality of discrete memory elements each being individually capable of assuming a first and a second remanent magnetic state, said plurality of memory elements being arranged in rows and columns, a plurality of first inductive means magnetically coupled to the memory elements of said rows respectively for selectively driving said last-mentioned elements from said first remanent state to said second remanent state and back to said first remanent state, a plurality of fixed second inductive means associated with the memory elements of said columns respectively for selectively varying the magnetic coupling between said first inductive means and the memory elements of said rows in accordance with binary input information bits, and a plurality of read-out means associated with said columns of memory elements respectively.

13. An information storage circuit comprising a magnetic memory element capable of assuming a first and a second remanent magnetic state, and means for writing binary information in said memory element comprising electrical conducting means magnetically coupled to said memory element, means for applying a reset current pulse to said conducting means for driving said memory element to said first remanent magnetic state representative of a first binary bit, electrically conducting magnetic shunting means magnetically coupled to said electrical conducting means for shunting drive fields generated by said last-mentioned means, means for applying a set current pulse to said electrical conducting means, and means for applying an enabling current pulse to said shunting means for permitting said drive fields to drive said memory element to said second remanent magnetic state representative of a second binary bit.

14. An information storage circuit according to claim 13 also comprising means for reading said binary information from said memory element comprising means for applying a second reset current pulse to said conducting means for subsequently again driving said memory element to said first remanent magnetic state and read-out means energized responsive to changes in the remanent magnetic states of said memory element for generating output signals indicative of said binary bits.

15. An information storage circuit according to claim 14 in which said memory element comprises a magnetic wire memory element and said read-out means comprises the electrically conducting portion of said wire memory element.

16. An electrical circuit comprising a magnetic memory element comprising a first electrical conductor having a helical magnetic flux component axially coincident therewith, said flux component having substantially rectangular hysteresis characteristics, a second electrical conductor inductively coupled to said memory element and defining an information address segment thereon, an electrically conducting magnetic shunting means of a material having a high magnetic permeability inductively associated with said second electrical conductor, and means for writing binary information in said address segment comprising means for applying a first write current pulse to said second electrical conductor of a magnitude sufficient to cause a flux switching in said address segment when said shunting means is ineffective and means for applying an enabling second write current pulse to said shunting means coincidentally with said first write current pulse to change the permeability of and thereby render ineffective said last-mentioned means.

17. An electrical circuit according to claim 16 in which said shunting means comprises a flat strip element arranged parallel to said memory element.

18. An electrical circuit according to claim 16 in which said shunting means comprises another magnetic memory element comprising an electrical conductor having at least one helical magnetic flux component axially coincident therewith.

References Cited in the file of this patent

UNITED STATES PATENTS

| | | |
|---|---|---|
| 2,041,147 | Preisach | May 9, 1936 |
| 2,820,216 | Grotrupp | Jan. 14, 1958 |
| 2,902,678 | Kosonocky | Sept. 1, 1959 |
| 2,952,840 | Ridler et al. | Sept. 13, 1960 |
| 2,988,732 | Vinal | June 13, 1961 |
| 2,988,733 | Mallery | June 13, 1961 |
| 3,058,097 | Poland | Oct. 9, 1962 |

OTHER REFERENCES

Publication I: The Bell System Technical Journal, vol. 36, No. 6, November 1927, pp. 1319–1340, 70A.